US012679128B2

(12) United States Patent

Oishi et al.

(10) Patent No.: US 12,679,128 B2

(45) Date of Patent: Jul. 14, 2026

(54) PRINTING APPARATUS

(71) Applicant: Toshiba Tec Kabushiki Kaisha, Tokyo (JP)

(72) Inventors: Sadatoshi Oishi, Fuji Shizuoka (JP); Masakazu Kato, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 147 days.

(21) Appl. No.: 18/620,357

(22) Filed: Mar. 28, 2024

(65) Prior Publication Data

US 2025/0065655 A1 Feb. 27, 2025

(30) Foreign Application Priority Data

Aug. 22, 2023 (JP) ................................ 2023-134731

(51) Int. Cl.

*B41J 35/36* (2006.01)
*B41J 35/02* (2006.01)

(52) U.S. Cl.

CPC ............... *B41J 35/36* (2013.01); *B41J 35/02* (2013.01)

(58) Field of Classification Search

CPC ... B41J 32/00; B41J 35/36; B41J 35/02; B41J 17/36; B41J 33/00; H04L 2209/805; H04L 9/3263; H04L 63/0823

See application file for complete search history.

(56) References Cited

U.S. PATENT DOCUMENTS

| | | | |
|---|---|---|---|
| 2003/0059050 A1 | 3/2003 | Hohberger et al. |
| 2008/0008511 A1 | 1/2008 | Chino |
| 2014/0292490 A1 | 10/2014 | Butler et al. |
| 2021/0146694 A1 | 5/2021 | Wagener et al. |
| 2023/0053200 A1 | 2/2023 | Nakano |

FOREIGN PATENT DOCUMENTS

| | | |
|---|---|---|
| EP | 1145164 B1 | 6/2009 |
| JP | 2010076351 A | 4/2010 |
| JP | 2016-162094 A | 9/2016 |
| JP | 2023025435 A | 2/2023 |

OTHER PUBLICATIONS

Extended European Search Report mailed Oct. 31, 2024 in corresponding European Patent Application No. 24176527.0, 9 pages.

Notice of Reasons for Refusal (1st Office Action) mailed Mar. 10, 2026, in corresponding Japanese Patent Application No. 2023-134731, with English machine translation, 8 pages.

*Primary Examiner* — Kristal Feggins

(74) *Attorney, Agent, or Firm* — Kim & Stewart LLP

(57) ABSTRACT

According to an embodiment, a printing apparatus mounts an ink ribbon provided with a wireless tag storing a digital certificate that is generated using an encryption algorithm on the basis of a private key and a unique identifier (ID) of the wireless tag. The printing apparatus communicates with the wireless tag, and reads the unique ID of the wireless tag and also reads the digital certificate stored in the wireless tag. Further, the printing apparatus verifies the digital certificate on the basis of a public key and the unique ID read from the wireless tag to determine whether or not the ink ribbon is a genuine product.

10 Claims, 13 Drawing Sheets

PRINTING APPARATUS

CROSS-REFERENCE TO RELATED APPLICATIONS

This application is based upon and claims the benefit of priority from the prior Japanese Patent Application No. 2023-134731, filed on Aug. 22, 2023, the entire contents of which are incorporated herein by reference.

FIELD

Embodiments described herein generally relate to a printing apparatus that uses an ink ribbon.

BACKGROUND

For example, a label printer conveys an ink ribbon superimposed on long label paper and transfers an ink of the ink ribbon onto the label paper by a thermal head to print various types of information such as a bar code on each label of the label paper.

The label printer changes a printing speed in accordance with the type of ink ribbon to be used. From the past, there has been a technique in which a wireless tag is provided to a ribbon roll, which is obtained by winding an ink ribbon, and data communication is performed between the printer body and the wireless tag. Use of this technique makes it possible to automatically set the printing speed of the printer body to a speed suitable for an ink ribbon of a ribbon roll newly mounted on the printer body.

Meanwhile, in a printer using a ribbon cartridge housing an ink ribbon, a wireless tag is mounted on the ribbon cartridge, and whether or not the ribbon cartridge is a genuine product such as an authentic product or a recommended product is determined on the basis of the information stored in the wireless tag, as a countermeasure against bad products or pirated cartridges.

DETAILED DESCRIPTION

Figure 1:
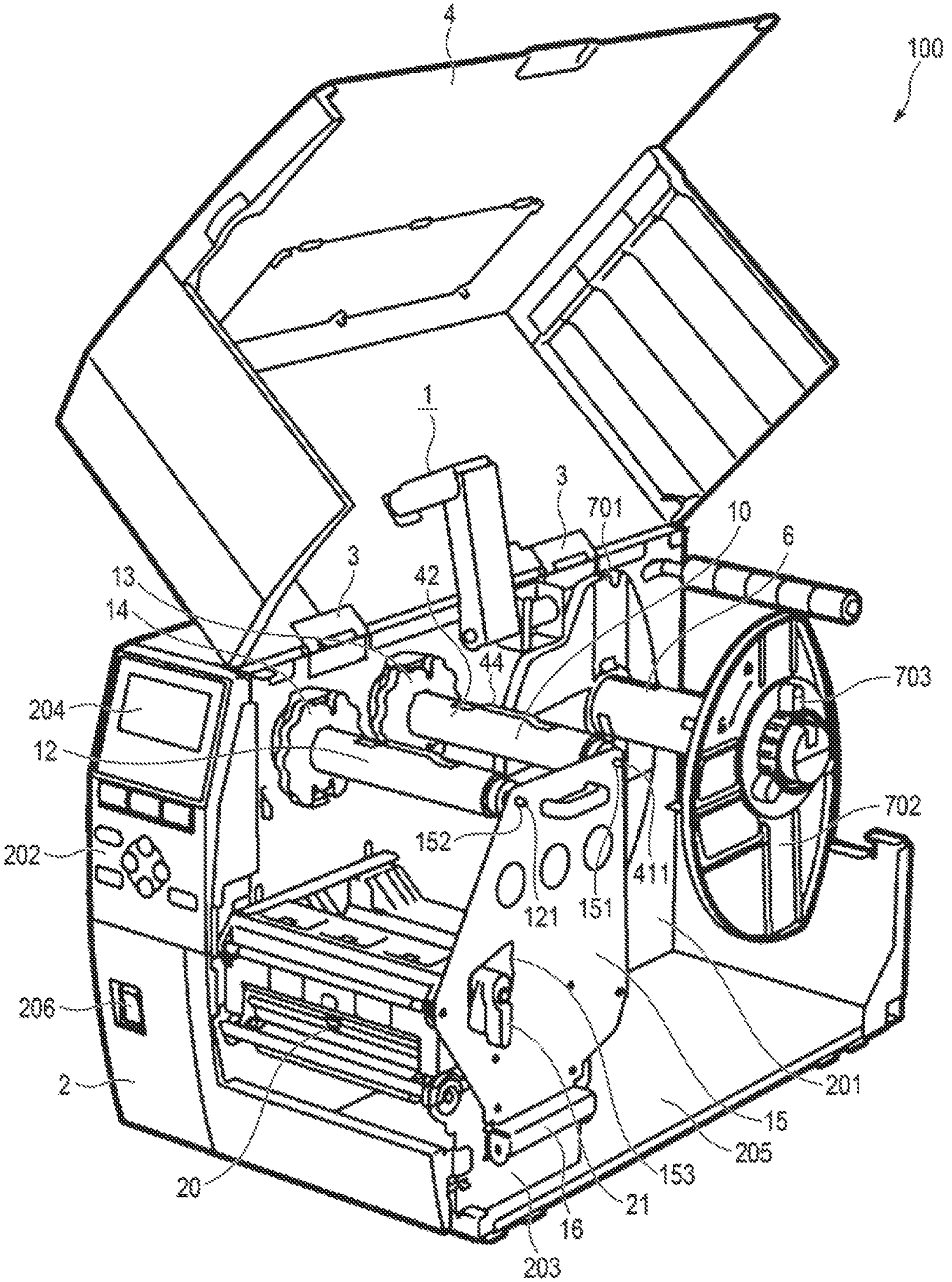
FIG. 1 is a schematic view of a label printer according to a first embodiment.

According to one embodiment, a printing apparatus includes a mounting portion, a reading device, and a controller. On the mounting portion, an ink ribbon is mounted, the ink ribbon being provided with a wireless tag storing a digital certificate that is generated using an encryption algorithm on the basis of a private key and a unique identifier (ID) of the wireless tag. The reading device communicates with the wireless tag, and reads the unique ID of the wireless tag and also reads the digital certificate stored in the wireless tag. Further, the controller verifies the digital certificate on the basis of a public key and the unique ID read from the wireless tag to determine whether or not the ink ribbon is a genuine product.

Hereinafter, embodiments will be described with reference to the drawings. Note that the scale of each portion may be appropriately changed in the drawings to be used in the following description. Further, in the drawings, the configuration may be simplified or omitted for easy understanding of the description. Furthermore, in the drawings, the same reference symbols denote the same or similar portions.

First Embodiment

Hereinafter, a label printer 100 according to a first embodiment will be described with reference to FIGS. 1 to 10. The label printer 100 is an example of a printing apparatus.

FIG. 1 is a schematic view of the label printer 100 according to the first embodiment. As shown in FIG. 1, the label printer 100 includes a casing 2 and a cover 4. The cover 4 is rotatably connected to the casing 2 via two hinges 3. The cover 4 is rotatable between an open position shown in FIG. 1, at which the inside of the casing 2 is uncovered, and a closed position at which the inside of the casing 2 is covered. A damper 1 for slowing down opening and closing of the cover 4 is provided between the cover 4 and the casing 2. The label printer 100 has a substantially rectangular block-like outer shape in the closed state of the cover 4.

An operation device 202, a display device 204, and a power supply switch 206 are provided on the front surface of the casing 2. The operation device 202 is used to input information regarding label paper, the number of printed sheets, and the like. The display device 204 displays operation information, an operation menu, and the like.

The label printer 100 includes a supply shaft 6 onto which a label paper roll is fitted, a delivery shaft 10 onto which a ribbon roll is detachably fitted, the ribbon roll being obtained by winding an ink ribbon before used around a paper core 30 (FIG. 5), a rewinding shaft 12 onto which a ribbon roll is detachably fitted, the ribbon roll being obtained by rewinding the ink ribbon after used, and a printing unit 20. The delivery shaft 10 is an example of a mounting portion.

The label paper roll is a roll obtained by winding long strip-shaped label paper into a roll shape. The label paper is an example of a printed medium, which is obtained by attaching a plurality of labels side by side on one surface of a long mount. The label has an adhesive layer on its surface on the side of the mount, and is detachable from the mount and attachable to another article after being peeled from the mount. The label paper roll is a roll obtained by winding the label paper around a core material, with the surface of the mount to which the labels are attached facing inward. The printed medium is not limited to the label paper and may be, for example, strip-shaped thermal paper.

The ribbon roll is a roll obtained by winding a long ink ribbon into a roll shape. The ink ribbon holds an ink to be transferred to the label paper by heat. The ribbon roll before used is a roll obtained by winding an ink ribbon before the ink is transferred therefrom around the paper core 30, which is an example of a cylindrical body, and the diameter of the ribbon roll is reduced by being used. A ribbon roll after used is a roll obtained by rewinding the ink ribbon after the ink is transferred therefrom, and the diameter of the ribbon roll grandually increases. In other words, the ink ribbon drawn from the ribbon roll before used is rewound on the downstream of the printing unit 20, which is the ribbon roll after used.

Figure 2:
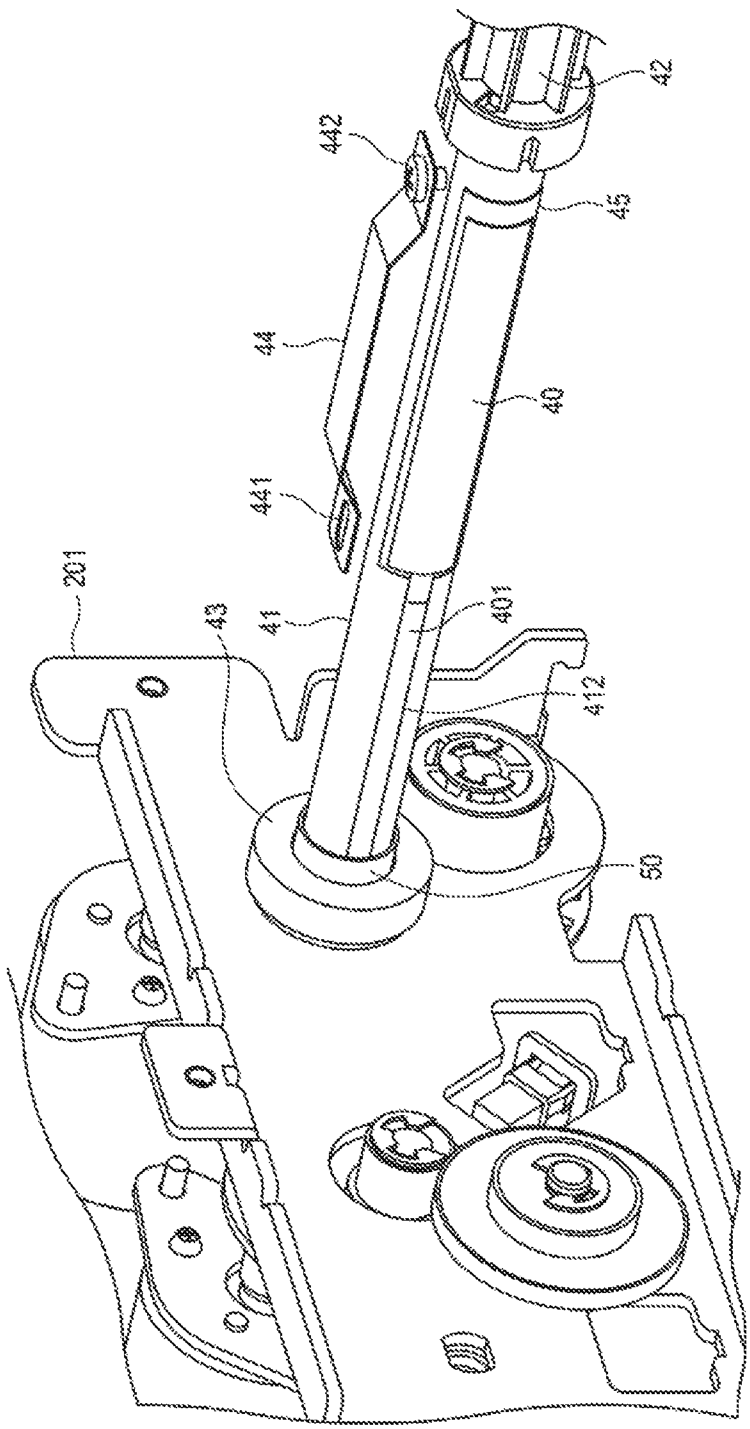
FIG. 2 is a partially enlarged perspective view of a main part of a delivery shaft of the label printer shown in FIG. 1.
Figure 3:
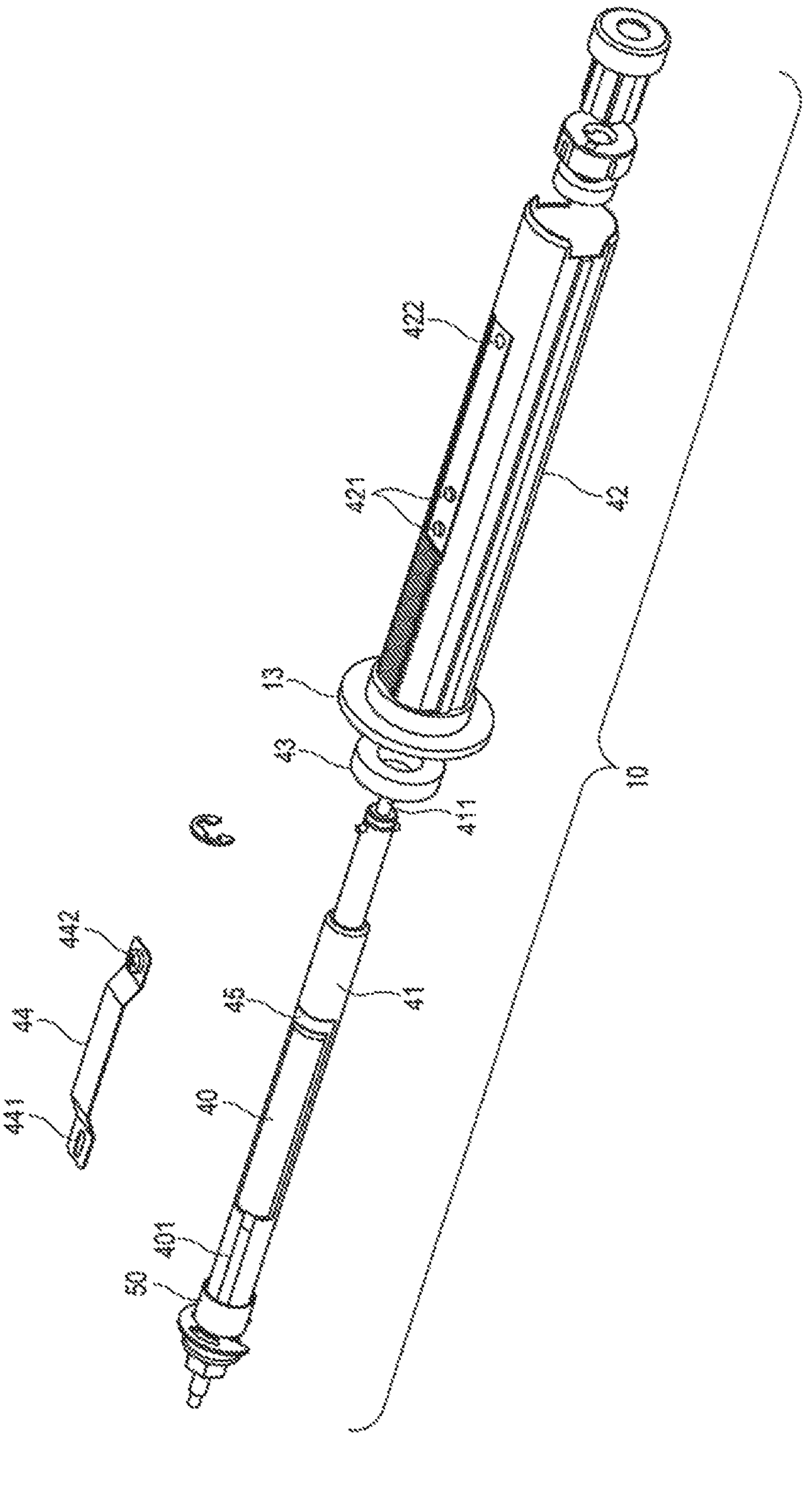
FIG. 3 is an exploded perspective view of the delivery shaft shown in FIG. 2.

A side wall 201 of the casing 2 fixes one ends of the supply shaft 6, the delivery shaft 10, and the rewinding shaft 12. In other words, the side wall 201 holds the three shafts of the supply shaft 6, the delivery shaft 10, and the rewinding shaft 12 in a cantilever-like state. The rewinding shaft 12 has substantially the same structure as the delivery shaft 10 except that the rewinding shaft 12 does not include an antenna 40 to be described later (FIGS. 2 and 3). Therefore, hereinafter, a detailed description of the rewinding shaft 12 will be omitted.

The supply shaft 6 includes, near both ends thereof in the longitudinal direction, two holding plates 701 and 702 that come into contact with both axial end surfaces of the label paper roll. The holding plate 701 on the far side, which is closer to the side wall 201, is movable along the longitudinal direction of the supply shaft 6. The holding plate 701 determines a fitting position of the label paper roll in the axial direction so as to align the center of the label paper roll in the axial direction with the center of the label printer 100. The holding plate 702 on the near side, which is fitted near the end of the supply shaft 6 distant from the side wall 201 of the casing 2, is fixed to the supply shaft 6 by a fixture 703.

When the label paper roll is fitted onto the supply shaft 6, the label paper roll is fitted onto the supply shaft 6 with the holding plate 702 on the near side being removed from the supply shaft 6. Subsequently, the holding plate 702 on the near side is fitted onto the end on the near side of the supply shaft 6. The label paper of the label paper roll is drawn from the label paper roll by a conveying roller 68 (FIG. 6) and then discharged from the label printer 100 through the printing unit 20.

The delivery shaft 10 and the rewinding shaft 12 for the ribbon roll respectively include stopper plates 13 and 14 near the side wall 201 of the casing 2. The stopper plates 13 and 14 are movable along the longitudinal direction of the respective shafts 10 and 12. An end in the axial direction of the ribbon roll before used, which is fitted onto the delivery shaft 10, is caused to abut on the stopper plate 13 so as to align the center of the ribbon roll in the axial direction with the center of the label printer 100. An end in the axial direction of the ribbon roll after used, which is fitted onto the rewinding shaft 12, is caused to abut on the stopper plate 14 so as to align the center of the ribbon roll in the axial direction with the center of the label printer 100.

A ribbon-shaft fixing plate 15 is located at a position facing the ends of the delivery shaft 10 and the rewinding shaft 12 on the near side distant from the side wall 201. The ribbon-shaft fixing plate 15 is rotatably connected to a support plate 203 via a hinge 16, the support plate 203 being provided upright from a bottom wall 205 of the casing 2. The ribbon-shaft fixing plate 15 includes a receiving hole 151 and a receiving hole 152. The receiving hole 151 receives a distal end 411 of a fixing shaft 41, which is to be described later, of the delivery shaft 10 (hereinafter, simply referred to as a distal end 411 of the delivery shaft 10 in some cases). The receiving hole 152 receives a distal end 121 of the rewinding shaft 12. The ribbon-shaft fixing plate 15 includes an insertion hole 153 through which a head lever 21 of the printing unit 20 is inserted.

When the ribbon roll is fitted onto the delivery shaft 10, the ribbon-shaft fixing plate 15 is opened to a position not shown in the figure, and the ribbon roll is fitted onto the delivery shaft 10. Subsequently, the ribbon-shaft fixing plate 15 is rotated to the position shown in the figure, and then the distal end 411 of the delivery shaft 10 is inserted into the receiving hole 151 and the distal end 121 of the rewinding shaft 12 is inserted into the receiving hole 152. In this state, the ribbon-shaft fixing plate 15 fixes the distal end 411 of the delivery shaft 10 and the distal end 121 of the rewinding shaft 12.

The ink ribbon drawn from the ribbon roll fitted onto the delivery shaft 10 passes through the printing unit 20 and is rewound by the rewinding shaft 12. The printing unit 20 conveys the ink ribbon superimposed on the label paper and passes the ink ribbon through the printing unit 20 at the same speed as the label paper.

The printing unit 20 has a thermal head disposed on the opposite side of the ink ribbon from the label paper. The printing unit 20 includes a platen roller at a position facing the thermal head with the ink ribbon and the label paper interposed therebetween. The printing unit 20 presses the ink ribbon against the label paper by using the thermal head to thermally transfer the ink of the ink ribbon onto the label paper. The printing unit 20 prints a two-dimensional barcode or the like on the label of the label paper.

FIG. 2 is a partially enlarged perspective view of a main part of the delivery shaft 10 of the label printer 100. Further, FIG. 3 is an exploded perspective view of the delivery shaft 10. As shown in FIGS. 2 and 3, the delivery shaft 10 includes a fixing shaft 41 that is fixed to the side wall 201 of the casing 2 in a cantilever-like state, an intermediate sleeve 42 coaxially disposed on the outside of the fixing shaft 41, and a bearing 43 coaxially disposed on the outside of the fixing shaft 41.

The fixing shaft 41 is, for example, a solid metal shaft and fixed to the side wall 201 of the casing 2 in a cantilever-like state using a bolt. A distal end 411 of the fixing shaft 41 protrudes from an end on the near side of the intermediate sleeve 42.

The intermediate sleeve 42 has a substantially cylindrical shape and includes the bearing 43 thereinside near an end of the intermediate sleeve 42, the end being closer to the side wall 201. The bearing 43 is fitted inside of the end of the intermediate sleeve 42 and is fixed to the intermediate sleeve 42. The bearing 43 has a cylindrical shape and can be made of resin or metal. The inner diameter of the intermediate sleeve 42 is substantially the same as the outer diameter of the bearing 43.

The intermediate sleeve 42 is rotatable with respect to the fixing shaft 41 by the bearing 43. The intermediate sleeve 42 includes the above-mentioned stopper plate 13 on the outer side near the end of intermediate sleeve 42, the end being closer to the side wall 201. The stopper plate 13 is movable in the longitudinal direction of the intermediate sleeve 42 and can be fixed at a desired position in the longitudinal direction.

On outer an circumferential surface of the intermediate sleeve 42, two bosses 421 for positioning a plate spring 44, and a screw bore 422 for fastening and fixing the plate spring 44 to the outer circumferential surface of the intermediate sleeve 42 are provided. The plate spring 44 includes, at its one end closer to the side wall 201, a slit 441 through which the bosses 421 are inserted, and at the other end, a screw hole through which a screw 442 passes. The bosses 421 of the intermediate sleeve 42 are inserted into the slit 441, and the screw 442 is screwed into the screw bore 422, so that the plate spring 44 is fixed to the outer circumferential surface of the intermediate sleeve 42.

The plate spring 44 is made of metal and, with the paper core 30 of the ribbon roll being fitted onto the outside of the intermediate sleeve 42, presses the inner surface of the paper core 30 outward to fix the paper core 30 to the intermediate sleeve 42. The plate spring 44 protrudes from the outer circumferential surface of the intermediate sleeve 42 to such an extent that the intermediate sleeve 42 can be inserted into the paper core 30. The plate spring 44 has a circumferential width that is narrower than the width of an antenna 40 along the circumferential direction of the fixing shaft 41.

A sheet-shaped antenna 40 is provided to the outer circumferential surface of the fixing shaft 41. On the outer circumferential surface of the fixing shaft 41, wiring 401 is electrically connected to the antenna 40 and extends in the longitudinal direction of the fixing shaft 41. The antenna 40 and the wiring 401 are, for example, continuous metal foil and may be formed by patterning a metal foil on the surface of a flexible circuit board. For example, the pattern of the antenna 40 is in the form of a loop antenna to form a magnetic field.

A magnetic sheet 45 is provided between the outer circumferential surface of the fixing shaft 41 and the antenna 40. The magnetic sheet 45 is provided such that an eddy current is generated in the metal fixing shaft 41 by the magnetic field formed by the antenna 40 and does not cancel the magnetic field formed by the antenna 40. Thus, the magnetic sheet 45 has a size slightly larger than the antenna 40 so as to be located between the antenna 40 and the fixing shaft 41.

Since the antenna 40 is separated from the outer circumferential surface of the fixing shaft 41 by the thickness of the magnetic sheet 45, an end of the wiring 401, which is closer to the antenna 40, is slightly inclined in a direction separated away from the outer circumferential surface of the fixing shaft 41 toward the antenna 40. Since the bearing 43 is provided between the intermediate sleeve 42 and the fixing shaft 41, the inner diameter of the intermediate sleeve 42 is sufficiently larger than the outer diameter of the fixing shaft 41. Thus, when the fixing shaft 41 is inserted into the intermediate sleeve 42 or when the intermediate sleeve 42 rotates relative to the fixing shaft 41, the inner surface of the intermediate sleeve 42 does not come into sliding contact with the antenna 40 and the wiring 401.

Figure 4:
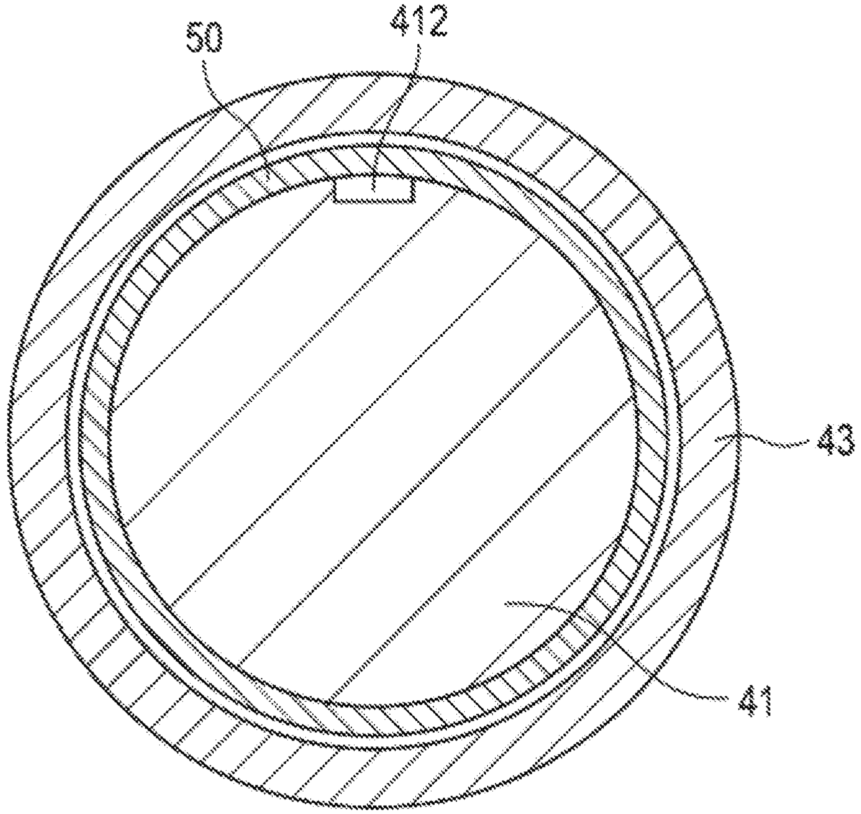
FIG. 4 is a cross-sectional view of a main part of the delivery shaft shown in FIG. 2.

FIG. 4 is a cross-sectional view of a main part of the delivery shaft 10. As shown in FIGS. 2 and 4, the fixing shaft 41 includes a groove-like recess 412 provided on the outer circumferential surface along the longitudinal direction of the fixing shaft 41. The width of the recess 412 along the circumferential direction of the fixing shaft 41 is slightly wider than the width of the wiring 401. The depth of the recess 412 is slightly deeper than the thickness of the wiring 401. After the magnetic sheet 45 is attached to the outer circumferential surface of the fixing shaft 41 by bonding, the antenna 40 is attached to the magnetic sheet 45 to overlap therewith.

A protective sleeve 50 is provided near the end of the fixing shaft 41, the end being closer to the side wall 201. The protective sleeve 50 has an inner diameter substantially the same as the outer diameter of the fixing shaft 41 and has an outer diameter slightly smaller than the inner diameter of the bearing 43. In other words, there is a gap corresponding to the thickness of the protective sleeve 50, between the intermediate sleeve 42 and the fixing shaft 41. The protective sleeve 50 is interposed between the wiring 401 and the bearing 43 and is fitted into and fixed to the end of the fixing shaft 41.

When the fixing shaft 41, to which the protective sleeve 50 is fixed, is inserted into the intermediate sleeve 42, in which the bearing 43 is fitted at one end thereof, to fit the intermediate sleeve 42 on the fixing shaft 41, the inner circumferential surface of the bearing 43 comes into contact with the outer circumferential surface of the protective sleeve 50. Since the inner diameter of the bearing 43 is slightly larger than the outer diameter of the protective sleeve 50 and there is a slight gap therebetween, the intermediate sleeve 42 provided with the bearing 43 is rotatable relative to the fixing shaft 41 provided with the protective sleeve 50. The protective sleeve 50 prevents an failure in which the intermediate sleeve 42 coms into sliding contact with the wiring 401 housed in the recess 412 of the fixing shaft 41 when the intermediate sleeve 42 rotates relative to the fixing shaft 41.

Figure 5:
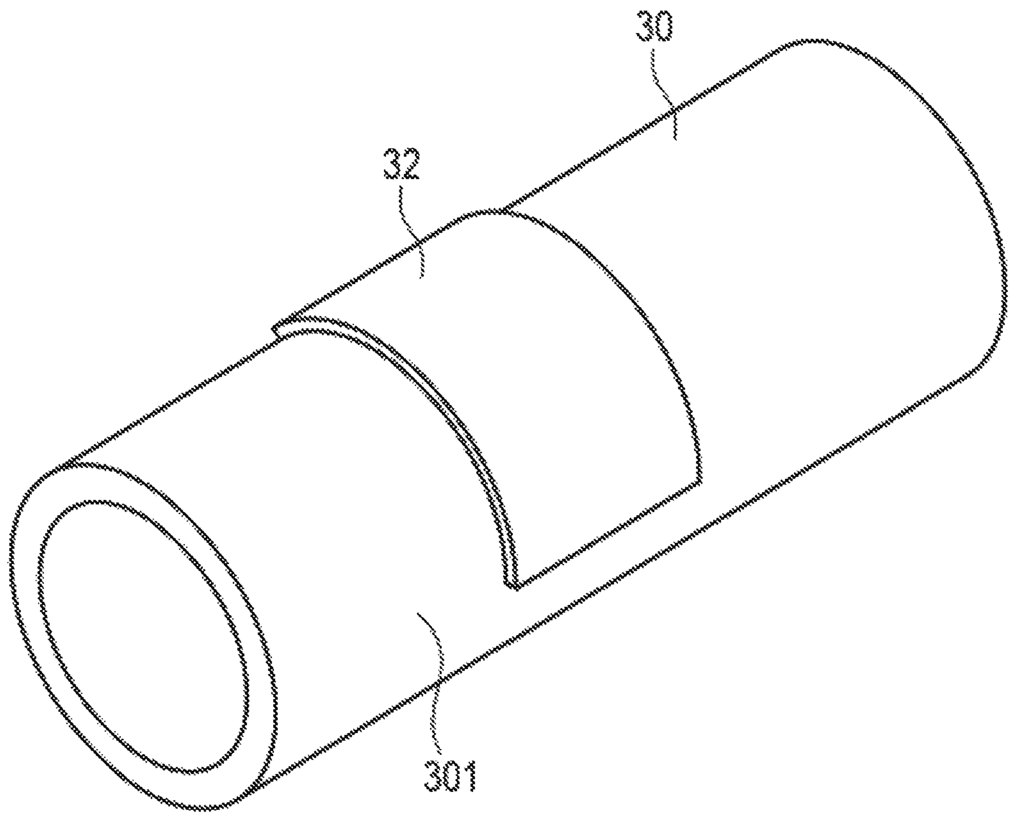
FIG. 5 is a perspective view of a paper core of a ribbon roll fitted onto the delivery shaft shown in FIG. 2.

FIG. 5 is a perspective view of the paper core 30 of the ribbon roll fitted onto the delivery shaft 10. As shown in FIG. 5, the paper core 30 of the ribbon roll mounted on the delivery shaft 10 includes an IC tag 32 that communicates wirelessly. The IC tag 32 is in the form of a rectangular sheet, and is attached to an outer circumferential surface 301 of the paper core 30 by bonding, at substantially the center in the axial direction of the paper core 30. The ink ribbon is wound around the outer circumferential surface of the paper core 30 to overlap with the outside of the IC tag 32. The IC tag 32 only needs to be provided to the paper core 30 and may also be provided to the inner surface of the paper core 30, an intermediate portion between the outer circumferential surface and the inner surface of the paper core 30, or the like. The IC tag is an example of a wireless tag.

Figure 6:
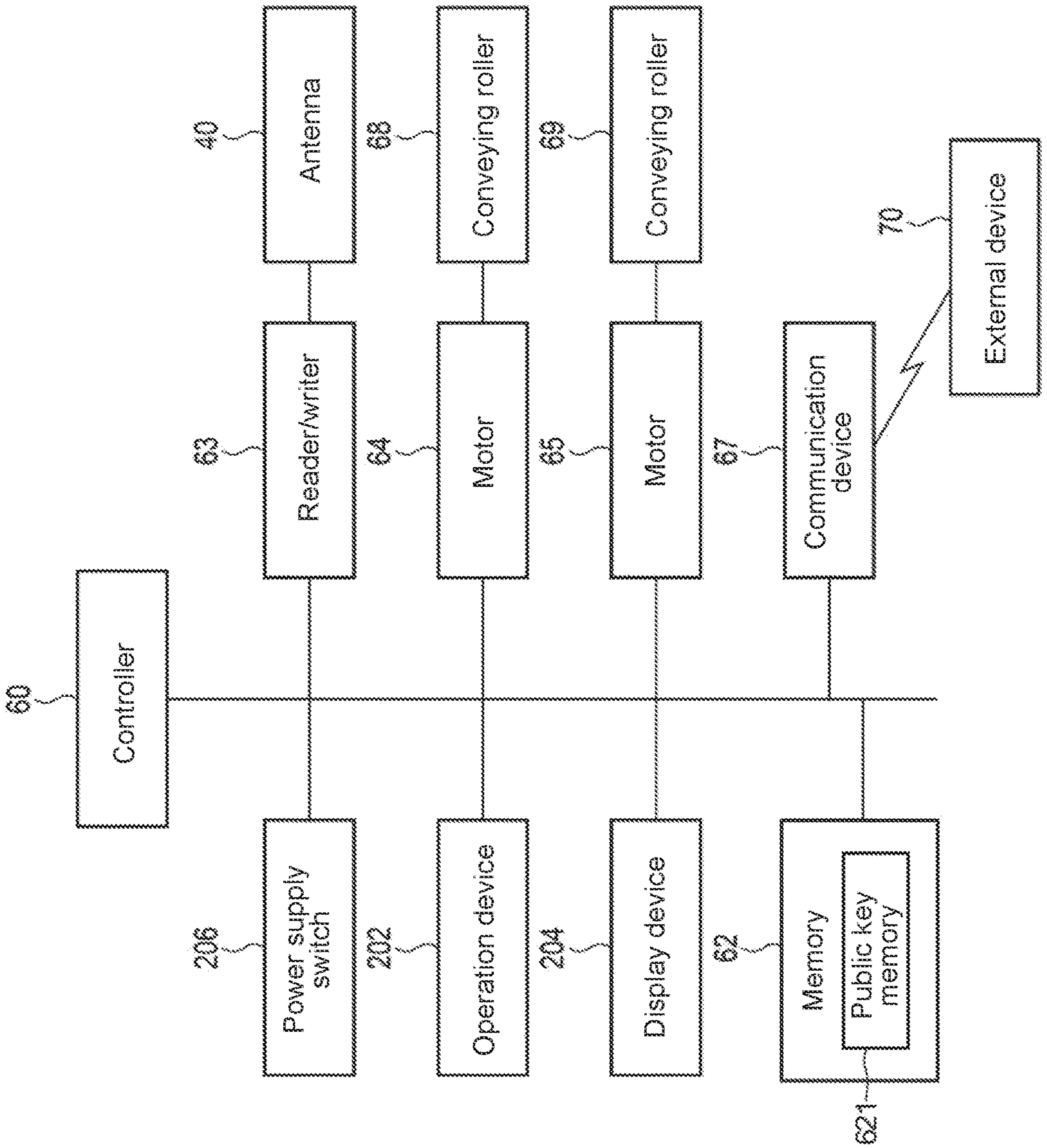
FIG. 6 is a block diagram showing a control system of the label printer shown in FIG. 1.

FIG. 6 is a block diagram showing an example of a control system of the label printer 100. As shown in FIG. 6, the label printer 100 includes a controller 60 that sets a printing speed in accordance with the type of ink ribbon. The controller 60 is, for example, a processor such as a central processing unit (CPU). The processor may be, for example, a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor may be a combination of some of those described above.

The controller 60 connects the power supply switch 206, the operation device 202, the display device 204, a memory 62, a reader/writer 63, motors 64 and 65, and a communication device 67 to one another.

The memory 62 stores a control program and also stores data related to a printing speed suitable for the type of ink ribbon. Furthermore, the memory 62 includes a public key memory 621 that stores a public key. The public key can be provided by a ribbon manufacturer who manufactures the ribbon roll, and can be stored in the public key memory 621 at the time of manufacture of the label printer 100. In other words, the label printer 100 can store the public key in advance.

The reader/writer 63 wirelessly communicates with the IC tag 32 via the antenna 40 to write data to the IC tag 32 and read data from the IC tag 32. The motor 64 rotates a conveying roller 68 that draws the label paper from the label paper roll. The motor 65 rotates a conveying roller 69 that conveys the ink ribbon.

The communication device 67 transmits and receives various types of data to and from an external device 70 such as a host computer via a network or directly. The communication device 67 may be a wireless communication device or a wired communication device. The data received from the external device 70 includes printing data. Further, the external device 70 may include a server provided in cloud. The data received from the server includes a public key. In other words, when the ribbon manufacturer updates the public key or makes a new public key available along with the release of a new product, the label printer 100 can receive the public key from the server and update the public key stored in the public key memory 621. Note that the label printer 100 may include an interface with a removable storage medium such as a USB memory and may read a public key from the storage medium and store the public key in the public key memory 621.

When the power supply switch 206 is turned on, the controller 60 controls the reader/writer 63 to read data from the IC tag 32 via the antenna 40. In particular, in the label printer 100, it is designed to be able to open the cover 4 of the casing 2 so as to replace the ribbon roll only after the power supply switch 206 is once turned off, or it is recommended to once turn the power supply switch 206 off and then replace the ribbon roll when the ribbon roll of the delivery shaft 10 is replaced. Therefore, in many cases, when the label printer 100 is used after the ribbon roll of the delivery shaft 10 is replaced, the power supply switch 206 is turned on, and data is then read from the IC tag 32. Alternatively, the number of times of opening and closing of the cover 4 is stored in the memory 62 in a nonvolatile manner, and an opening and closing counter that mechanically counts the number of times of opening and closing of the cover 4 is provided, in which its count value can be read by the controller 60, so that the controller 60 may read data from the IC tag 32 only when the count value of the opening and closing counter differs from the number of times of opening and closing stored in the memory 62, instead of reading data from the IC tag 32 each time the power supply switch 206 is turned on.

Note that the IC tag 32 stores a unique identifier (UID) for uniquely identifying each IC tag in a non-rewritable manner. The UID is an example of a unique ID. Further, the IC tag 32 stores data related to the ink ribbon wound around the paper core 30. The data related to the ink ribbon includes, for example, a product name, a grade, a dimension, a color, a date of manufacture, and a serial number. The grade represents the type of ink ribbon, for example, for plain paper or a cardboard. The dimension represents the width and length of the ink ribbon, and the length may be referred to as the amount of ink ribbon. The serial number may be a manufacturing number. Those pieces of data related to the ink ribbon are examples of ribbon data. Furthermore, the IC tag 32 stores a digital certificate that is generated using an encryption algorithm on the basis of a private key, the UID, and the ribbon data.

Therefore, the controller 60 reads the UID, the ribbon data, and the digital certificate as the data from the IC tag 32. The reader/writer 63 and the antenna 40 are examples of a reading device. Subsequently, the controller 60 verifies the digital certificate on the basis of the public key stored in the public key memory 621 and the UID to determine whether or not the ink ribbon provided with the IC tag 32 is a genuine product. Therefore, the controller 60 is an example of a determination unit.

If the ink ribbon is a genuine product, the controller 60 reads, from the memory 62, a printing speed suitable for the type of ink ribbon in the ribbon data read from the IC tag 32, and controls the motors 64 and 65 to set that printing speed. The controller 60 controls the motors 64 and 65 to perform printing at that printing speed until the ink ribbon is exhausted. When the ink ribbon is exhausted, the controller 60 controls the reader/writer 63 to delete the digital certificate stored in the IC tag 32. Therefore, the controller 60 is also an example of a deletion unit. Note that "delete" means a complete deletion that makes restoration impossible, rather than a simple deletion such as a deletion of a part of the data. This "delete" also includes rewriting with other information, such as setting all of data to "0" or to "1", that is, destroying the original information.

As described above, in the label printer 100 according to this embodiment, the antenna 40 is provided to the delivery shaft 10 on which the ribbon roll is mounted, the ribbon roll being obtained by winding the ink ribbon around the paper core 30. Thus, the antenna 40 can be disposed close to the IC tag 32 attached to the paper core 30, and good data communication with the IC tag 32 can be performed.

Figure 7:
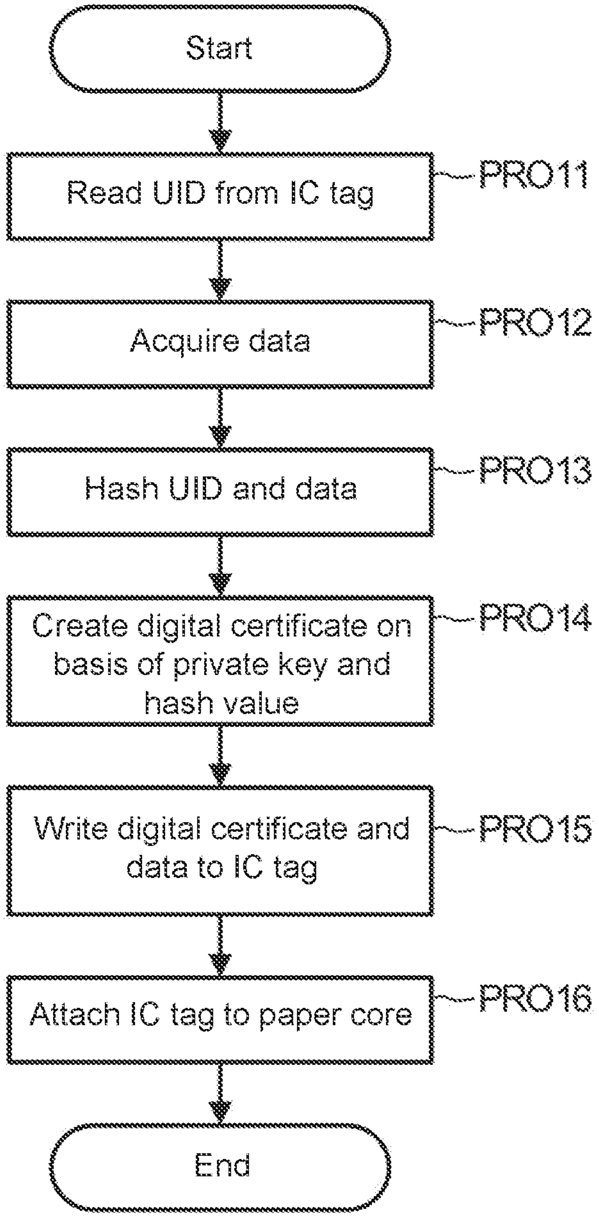
FIG. 7 is a flowchart for describing an example of the process of manufacturing a ribbon roll in an ink ribbon manufacturer in the first embodiment.
Figure 8:
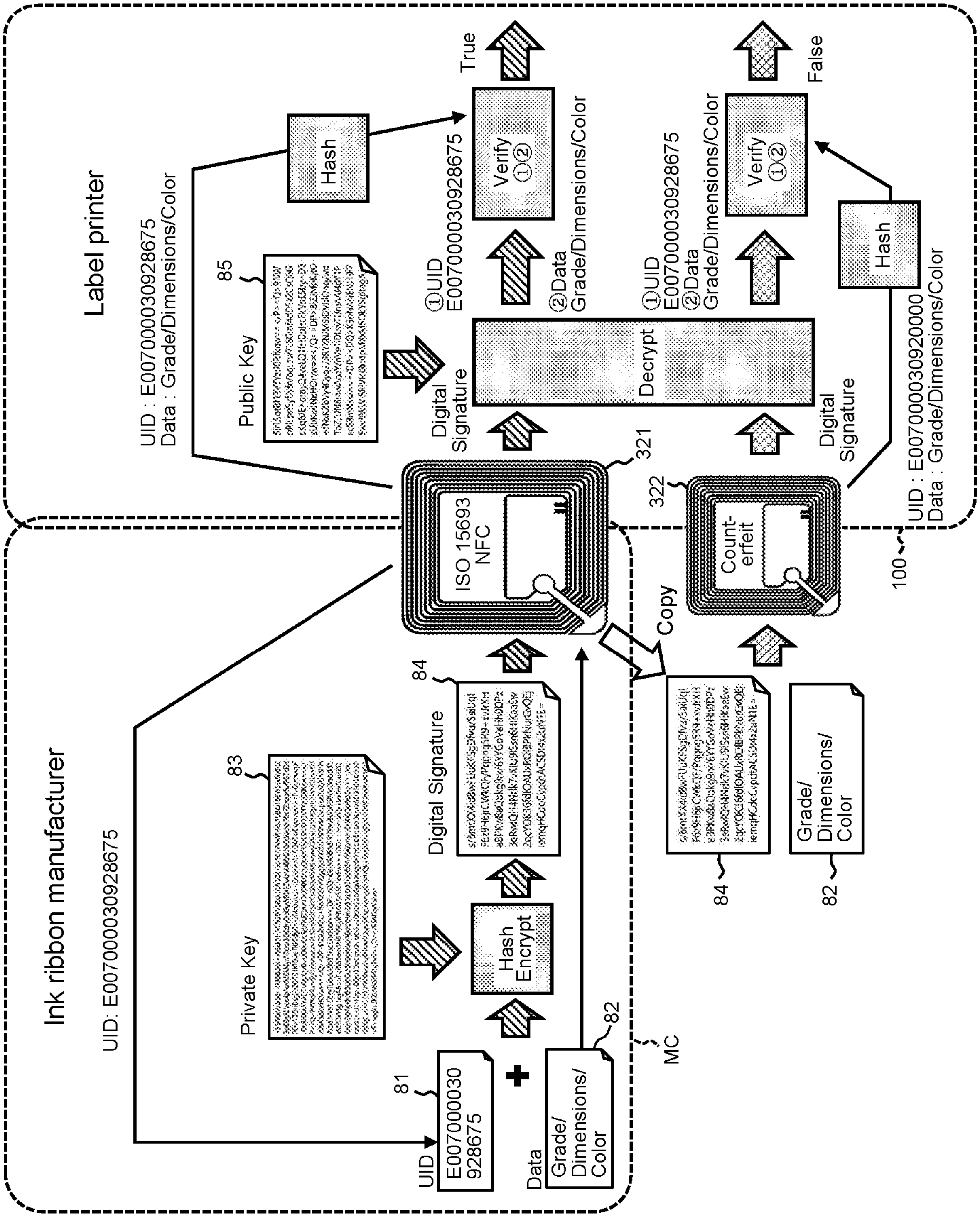
FIG. 8 is a schematic diagram showing the outline of a genuine-product determination operation in the first embodiment.
Figure 9:
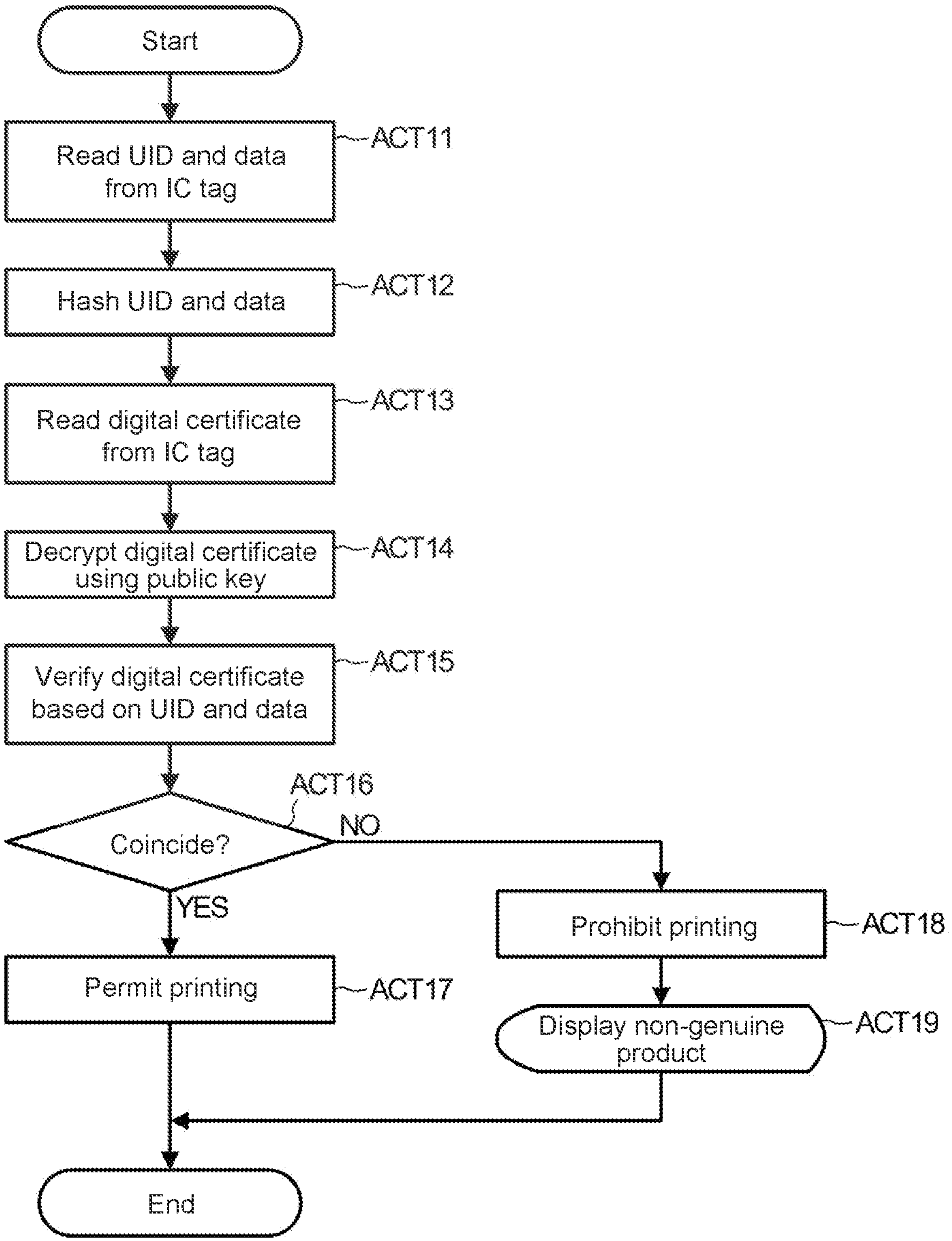
FIG. 9 is a flowchart showing an example of genuine-product determination processing by a controller shown in FIG. 6.

Hereinafter, a genuine-product determination operation in the first embodiment will be described with reference to FIGS. 7 to 9. FIG. 7 is a flowchart for describing an example of the process of manufacturing a ribbon roll in an ink ribbon manufacturer MC. FIG. 8 is a schematic diagram showing the outline of the genuine-product determination operation. FIG. 9 is a flowchart showing an example of genuine-product determination processing by the controller 60 of the label printer 100. Note that the manufacturing process in the ink ribbon manufacturer MC may be performed by a single machine or may also be performed by a plurality of machines, and may further allow manual intervention. In other words, the operation subject of each process is not limited.

In the ink ribbon manufacturer MC, as shown in FIGS. 7 and 8, first, a UID 81 is read from the IC tag 32 in the process PRO11.

Further, in the process PRO12, ribbon data 82 to be written to the IC tag 32 is acquired. Here, the method of acquiring the ribbon data may be any method such as inputting from an operation device member such as a keyboard, reading from a storage medium, and communication from an external device.

In the process PRO13, the UID 81 and the ribbon data 82 are hashed. Hashing is processing of obtaining a hash value that is obtained by converting data into an irregular character string by using an algorithm called a hash function. The hash value converted from the same data always have the same result, and thus the hash value fails to be restored after conversion.

In the process PRO14, a digital certificate 84 is created on the basis of a private key 83 and the hash value by using an encryption algorithm. This also means that the digital certificate 84 is created on the basis of the private key 83, the UID 81, and the ribbon data 82 by using the encryption algorithm. The private key 83 is strictly managed so as not to leak to the outside, and can be used only when the digital certificate 84 is created. The encryption algorithm is not particularly limited, but well-known RSA cryptography or elliptic curve cryptography can be used, for example. Since the elliptic curve cryptography reduces the size of data more than the RSA cryptography, it is suitable for the IC tag 32 having a limited storage capacity.

In the process PRO15, the created digital certificate 84 and the ribbon data 82 are written to the IC tag 32. In such a manner, a genuine IC tag 32 to be attached to the paper core 30 of the ribbon roll is completed (hereinafter, such a genuine IC tag 32 will be referred to as a genuine-product IC tag 321 in some cases).

Subsequently, in the process PRO16, the genuine-product IC tag 321 to which the digital certificate 84 and the ribbon data 82 are written is attached to the paper core 30.

In the next process, an ink ribbon is wound around the paper core 30 with the IC tag 32 thus created, thus completing a genuine product of a ribbon roll before used.

In the label printer 100, when the genuine product of the ribbon roll, which is completed in the ink ribbon manufacturer MC in such a manner, is mounted and the power supply switch 206 is turned on, the controller 60 starts the processing shown in FIG. 9 on the basis of the control program stored in the memory 62. Note that, unless otherwise specified, the processing operation of the controller 60 is assumed to transition to ACT (x+1) after ACTx (x is a natural number).

As shown in FIGS. 8 and 9, in ACT11, the controller 60 controls the reader/writer 63 to read the UID stored in a non-rewritable manner and the ribbon data 82 stored in a rewritable or non-rewritable manner from the IC tag 32 attached to the paper core 30 of the mounted ribbon roll.

In ACT12, the controller 60 hashes the read UID 81 and ribbon data 82. The hash value thus obtained is the same as the hash value obtained in the process PRO13 in the ink ribbon manufacturer MC.

In ACT13, the controller 60 controls the reader/writer 63 to read the digital certificate 84 from the IC tag 32.

In ACT14, the controller 60 decrypts the digital certificate 84 by a decryption algorithm corresponding to the encryption algorithm used in the process PRO14 in the ink ribbon manufacturer MC, using a public key 85 stored in the public key memory 621. Thus, the hash value of the UID 81 and the ribbon data 82, which are hashed in the process PRO13 in the ink ribbon manufacturer MC, is obtained.

In ACT15, the controller 60 verifies the digital certificate 84 based on the UID 81 and the ribbon data 82. Specifically, the hash value of the UID 81 and the ribbon data 82 derived from the digital certificate 84 decrypted in ACT14 is compared with the hash value of the UID 81 and the ribbon data 82 derived from the IC tag 32, which is acquired in ACT12.

In ACT16, the controller 60 determines whether or not both the hash values coincide with each other. In the genuine-product IC tag 321, the UID 81 that is the basis of the digital certificate 84 coincides with the UID stored in the IC tag 32 in a non-rewritable manner. Further, the ribbon data 82 that is the basis of the digital certificate 84 also coincide with the ribbon data 82 stored in the IC tag 32, so that the hash values thereof also coincide with each other.

In response to the determination that both the hash values coincide with each other (True) (YES in ACT16), the controller 60 determines that the mounted ribbon roll is a genuine product and permits printing in ACT17. The controller 60 then terminates the operation of the genuine-product determination processing.

After that, the controller 60 reads, from the memory 62, the printing speed suitable for the type of ink ribbon in the ribbon data 82 read from the IC tag 32, and controls the motors 64 and 65 to set that printing speed. The controller 60 controls the motors 64 and 65 to perform printing at that printing speed until the ink ribbon is exhausted.

Note that there is also a label printer that performs processing, such as rewriting the remaining amount of ink ribbon in the ribbon data stored in the IC tag 32, at a timing at which each printing task is completed. In this embodiment, the ribbon data 82 is used for verifying the digital certificate 84, and thus the controller 60 does not perform such processing.

Further, as shown in FIG. 8, a third party may copy the data stored in the genuine-product IC tag 321 of the ribbon roll completed in the ink ribbon manufacturer MC and create an IC tag 32 as a counterfeit product (hereinafter, such a counterfeit IC tag 32 may be referred to as a counterfeit-product IC tag 322). In this case, the digital certificate 84 and the ribbon data 82 are stored in the counterfeit-product IC tag 322. The third party can manufacture a counterfeit product of a ribbon roll by using the counterfeit-product IC tag 322. However, the UID cannot be rewritten in the counterfeit-product IC tag 322, and thus a UID different from that of the genuine-product IC tag 321 is stored. In the example of FIG. 8, the UID of the genuine-product IC tag 321 is "E007000030928675", whereas the UID of the counterfeit-product IC tag 322 is "E007000030920000".

Even if the ribbon roll of such a counterfeit product is mounted, in the label printer 100, the controller 60 executes the processing of ACT11 to ACT16 described above as in the case where the ribbon roll as a genuine product is mounted. The UID of the counterfeit-product IC tag 322 differs from the UID of the genuine-product IC tag 321. Therefore, the ribbon data 82 that is the basis of the digital certificate 84 coincides with the ribbon data 82 stored in the IC tag 32, whereas the UID 81 that is the basis of the digital certificate 84 does not coincide with the UID stored in the IC tag 32 in a non-rewritable manner. Therefore, the hash value of the UID 81 and the ribbon data 82 derived from the digital certificate 84 decrypted in ACT14 does not coincide with the hash value of the UID 81 and the ribbon data 82 derived from the counterfeit-product IC tag 322 acquired in ACT12.

In response to the determination that both the hash values do not coincide with each other (False) (NO in ACT16), the controller 60 determines that the mounted ribbon roll is not a genuine product and prohibits printing in ACT18.

In ACT19, the controller 60 displays, on the display device 204, the fact that a counterfeit product, i.e., a non-genuine product is mounted. The controller 60 then terminates the operation of the genuine-product determination processing.

Figure 10:
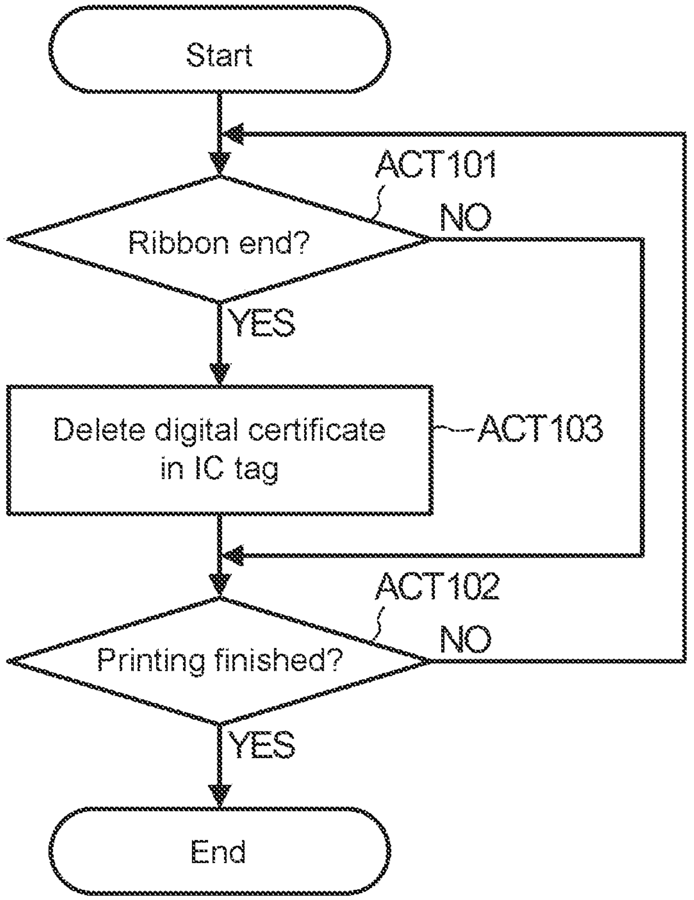
FIG. 10 is a flowchart showing an example of ribbon end processing by the controller shown in FIG. 6.

Next, an operation at the time of ribbon end in the first embodiment will be described with reference to FIG. 10. FIG. 10 is a flowchart showing an example of ribbon end processing by the controller 60. When a printing task is started, the controller 60 starts the processing shown in FIG. 10 on the basis of the control program stored in the memory 62.

In ACT101, the controller 60 determine whether or not the ribbon end is detected, that is, whether or not the ink ribbon of the mounted ribbon roll is exhausted. The method of detecting the ribbon end is not limited. For example, a plurality of reflective photosensors are arranged in a row at regular intervals on the side wall 201 of the label printer 100 so as to face the ribbon roll mounted on the delivery shaft 10, and the remaining amount of the ink ribbon is detected to detect the ribbon end by one of the plurality of reflective photosensors. Alternatively, it is also possible to detect the ribbon end if a rotating body such as a roller that comes into contact with the ink ribbon is provided in a conveyance path of the ink ribbon and if the ink ribbon is not conveyed even when the conveying roller 69 is rotated by the motor 65.

In response to the determination that the ribbon end is not detected (NO in ACT101), the controller 60 determines whether or not the printing task is finished in ACT102. In response to the determination that the printing task is finished (YES in ACT102), the controller 60 terminates the operation of the ribbon end processing. Further, in response to the determination that the printing task is not yet terminated (NO in ACT102), the controller 60 proceeds to the processing in ACT101.

In response to the determination that the ribbon end is detected (YES in ACT101), in ACT103, the controller 60 deletes at least the digital certificate 84 stored in the IC tag 32. Subsequently, the controller 60 proceeds to the processing in ACT102.

Note that the UID 81 and the ribbon data 82 are hashed in the first embodiment, but they are not necessarily hashed. In other words, in the ink ribbon manufacturer MC, raw data of the UID 81 and the ribbon data 82 are used to create the digital certificate 84, and the controller 60 of the label printer 100 also verifies the digital certificate 84 by comparing the raw data of the UID 81 and the ribbon data 82 read from the IC tag 32 with the UID 81 and the ribbon data 82 decrypted from the digital certificate 84.

As described above, in the label printer 100 according to the first embodiment, the ink ribbon is mounted, the ink ribbon being provided with the the IC tag 32 storing the digital certificate 84 that is generated using the encryption algorithm on the basis of the private key, the UID 81 of the IC tag 32, and the ribbon data 82, and the ribbon data 82. The controller 60 of the label printer 100 then controls the reader/writer 63 to communicate with the IC tag 32 and to read the UID 81 of the IC tag 32 and the ribbon data 82 and also read the digital certificate 84 stored in the IC tag 32. The controller 60 then verifies the digital certificate 84 on the basis of the public key stored in the public key memory 621 and the UID 81 and the ribbon data 82 read from and the IC tag 32 to determine whether or not the mounted ink ribbon is a genuine product. Therefore, in the label printer 100 according to the first embodiment, it is possible to determine whether or not the mounted ink ribbon is a genuine product.

Note that the UID 81 and the ribbon data 82 used to generate the digital certificate 84 are hashed, and thus in the label printer 100 according to the first embodiment, the controller 60 hashes the UID 81 and the ribbon data 82 read from the IC tag 32, and verifies the digital certificate 84 on the basis of the hashed UID 81 and ribbon data 82 and the public key. Therefore, even if the confidentiality of data is enhanced by hashing, in the label printer 100 according to the first embodiment, it is possible to determine whether or not the mounted ink ribbon is a genuine product.

Further, in the label printer 100 according to the first embodiment, the controller 60 deletes the digital certificate 84 stored in the IC tag 32 in response to the detection of the end of the ink ribbon. Therefore, it is possible to prevent the IC tag 32 of the ink ribbon in which the ink is exhausted from being reused.

Note that the public key stored in the public key memory 621 is stored in advance, but the public key can also be updated using a public key received from the external device 70 via the communication device 67. This makes it possible to replace a public key or the like to deal with the leakage of a private key or the like in the ink ribbon manufacturer MC.

Further, the label printer 100 according to the first embodiment includes: the delivery shaft 10 that is disposed to be inserted into the paper core 30 of the ribbon roll obtained by winding an ink ribbon around the paper core 30 including the IC tag 32, and rotatably supports the ribbon roll; and the antenna 40 provided to the delivery shaft 10 and used for data communication with the IC tag 32. In such a manner, the antenna 40 is provided to the delivery shaft 10 on which the ribbon roll is mounted, the ribbon roll being obtained by winding an ink ribbon around the paper core 30. This makes it possible to arrange the antenna 40 near the IC tag 32 attached to the paper core 30 and perform good data communication with the IC tag 32.

Second Embodiment

Figure 11:
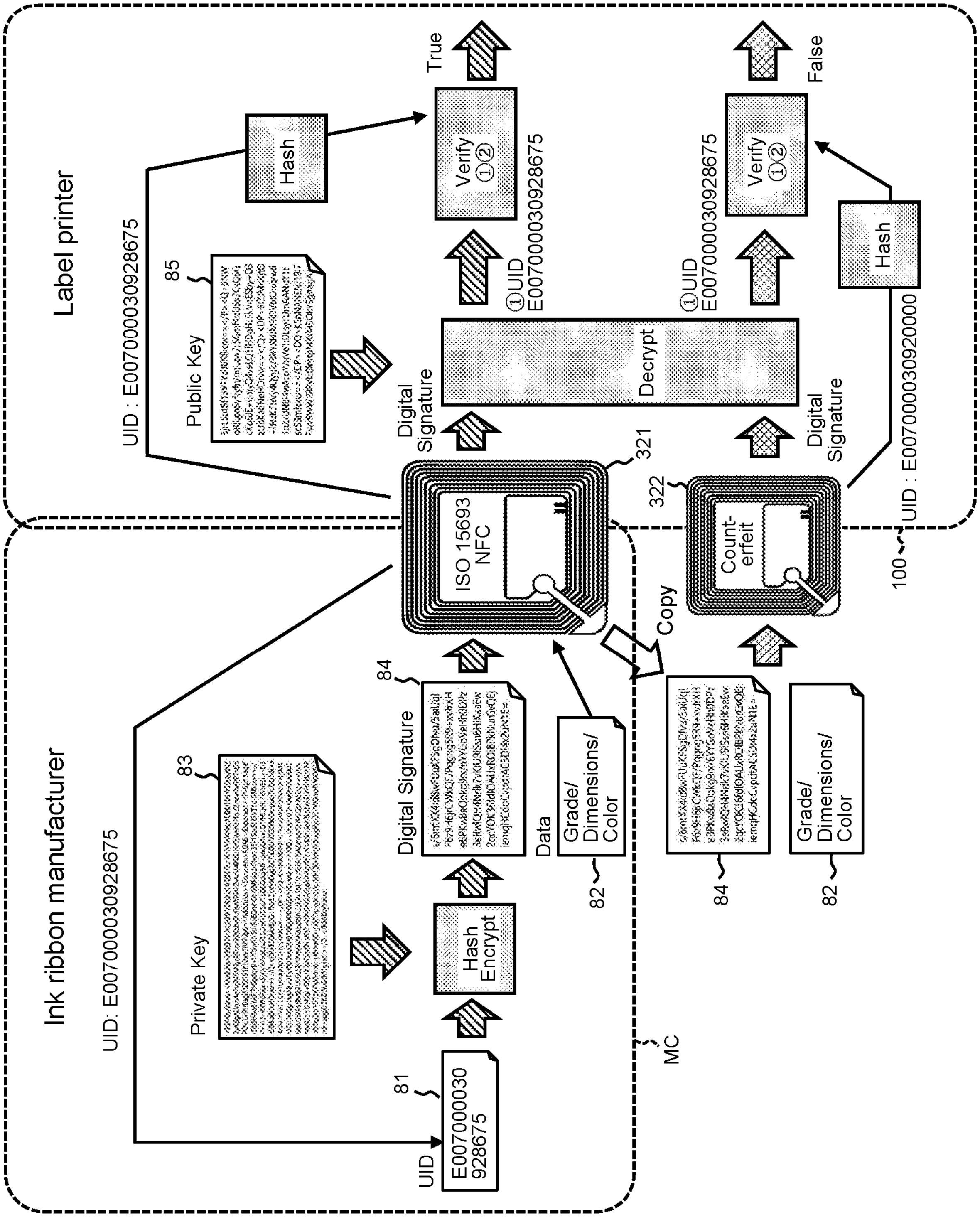
FIG. 11 is a schematic diagram showing the outline of a genuine-product determination operation in a second embodiment.
Figure 12:
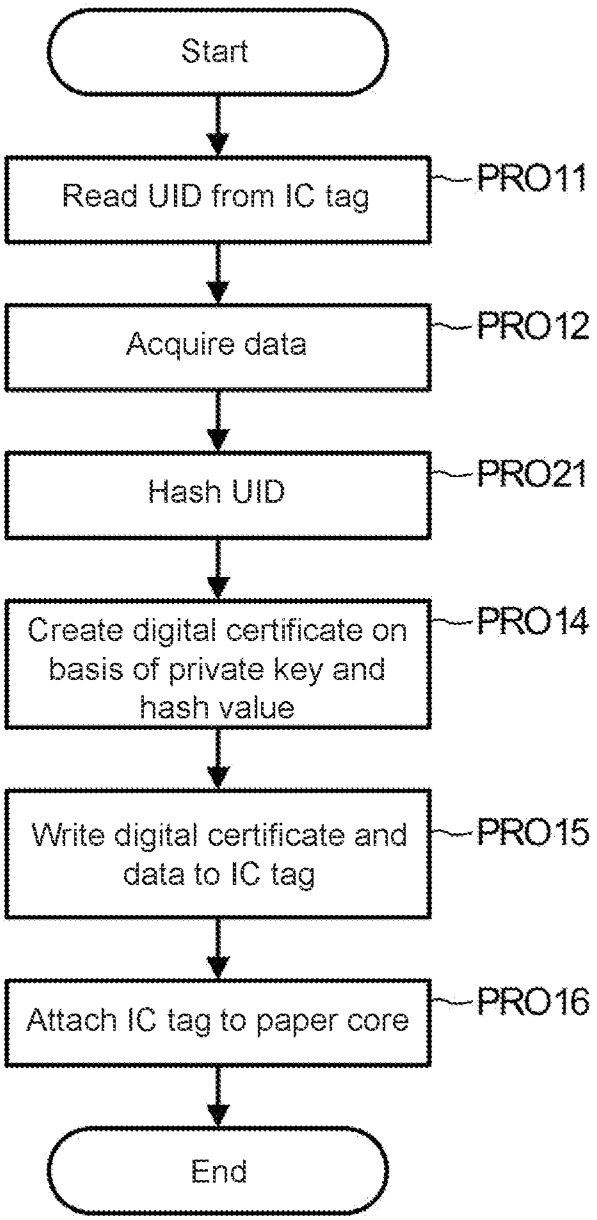
FIG. 12 is a flowchart for describing an example of the process of manufacturing a ribbon roll in an ink ribbon manufacturer in the second embodiment.
Figure 13:
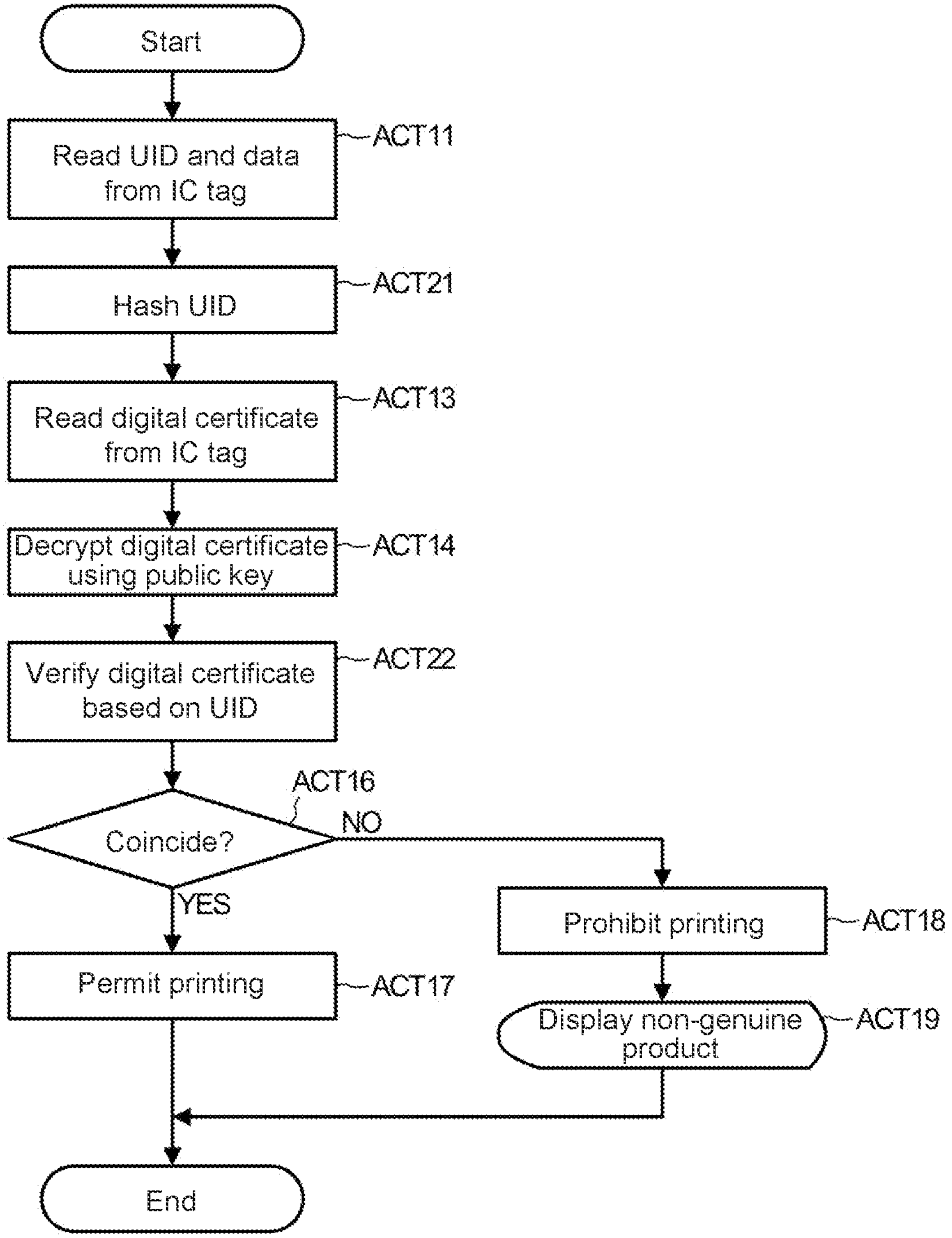
FIG. 13 is a flowchart for describing an example of genuine-product determination processing by a controller in a label printer according to the second embodiment.

A configuration of a label printer 100 in a second embodiment is similar to that of the first embodiment, and thus description thereof will be omitted. Hereinafter, an operation of the label printer 100 according to the second embodiment will be described with reference to FIGS. 11 to 13. FIG. 11 is a schematic view showing the outline of a genuine-product determination operation in the second embodiment. FIG. 12 is a flowchart for describing an example of the process of manufacturing a ribbon roll in an ink ribbon manufacturer MC in the second embodiment. FIG. 13 is a flowchart for describing an example of genuine-product determination processing by a controller 60 in the label printer 100 according to the second embodiment.

As shown in FIGS. 11 and 12, in the ink ribbon manufacturer MC, a UID 81 is read and ribbon data 82 is acquired in the processes PRO11 and PRO12, as in the first embodiment.

In this embodiment, in the process PRO21, only the UID 81 is hashed. In other words, in this embodiment, the ribbon data 82 is not hashed. Therefore, in the process PRO21, a hash value of the UID 81 is obtained.

Next, as in the first embodiment, in the process PRO14, a digital certificate 84 is created on the basis of a private key 83 and the hash value by using an encryption algorithm. However, in this embodiment, the hash value is obtained by hashing only the UID 81.

Subsequently, as in the first embodiment, in the process PRO15 and the process PRO16, the digital certificate 84 and the ribbon data 82 are written to an IC tag 32 to complete a genuine-product IC tag 321, and the genuine-product IC tag 321 is attached to a paper core 30.

In the label printer 100 according to this embodiment, as shown in FIGS. 11 and 13, in ACT11, the controller 60 reads the UID and the ribbon data 82 from the IC tag 32 as in the first embodiment.

In this embodiment, in ACT21, the controller 60 hashes the read UID 81 only. In other words, in this embodiment, the ribbon data 82 is not hashed. Therefore, in ACT21, the hash value of the UID 81 is obtained.

Subsequently, as in the first embodiment, in ACT13 and ACT14, the controller 60 reads the digital certificate 84 from the IC tag 32 and decrypts the digital certificate 84 by a decryption algorithm, using a public key 85 stored in a public key memory 621. In this case, unlike the first embodiment, the obtained hash value is the hash value of the UID 81 only, which is hashed in the process PRO21 in the ink ribbon manufacturer MC.

Therefore, in this embodiment, in ACT22, the controller 60 verifies the digital certificate 84 based on the UID 81. Specifically, the hash value of the UID 81 derived from the digital certificate 84 decrypted in ACT14 is compared with the hash value of the UID 81 derived from the IC tag 32, which is acquired in ACT21.

As in the first embodiment, the controller 60 then determines whether or not both the hash values coincide with each other in ACT16. In the genuine-product IC tag 321, the UID 81 that is the basis of the digital certificate 84 coincide with the UID stored in the IC tag 32 in a non-rewritable manner, and thus both the hash values coincide with each other.

In response to the determination that both the hash values coincide with each other (True) (YES in ACT16), as in the first embodiment, the controller 60 determines that the mounted ribbon roll is a genuine product and permits printing in ACT17. The controller 60 then terminates the operation of the genuine-product determination processing.

After that, the controller 60 can execute a printing task.

Further, since the ribbon data 82 is not used for the digital certificate 84 in this embodiment, there arises no problem even if the ribbon data stored in the IC tag 32 is rewritten. Therefore, the controller 60 can rewrite the remaining amount of ink ribbon in the ribbon data stored in the IC tag 32 at a timing at which each printing task is terminated. The controller 60 can also display the remaining amount of ink ribbon via the display device 204. Further, at the time of detection of the ribbon end as described in the first embodiment, when the processing of deleting at least the digital certificate 84 stored in the IC tag 32 is performed, the remaining amount of ink ribbon stored in the IC tag 32 can also be used in the detection of the ribbon end.

Further, as shown in FIG. 11, if a third party copies the data stored in the genuine-product IC tag 321 of the ribbon roll completed in the ink ribbon manufacturer MC and creates a counterfeit-product IC tag 322, the digital certificate 84 and the ribbon data 82 are stored in the counterfeit-product IC tag 322 as in the first embodiment. If a ribbon roll as a counterfeit product including the counterfeit-product IC tag 322 is mounted, in the label printer 100, the controller 60 executes the processing of ACT11, ACT21, ACT13, ACT14, ACT22, and ACT16 described above as in the case where the ribbon roll as a genuine product is mounted. The UID of the counterfeit-product IC tag 322 differs from the UID of the genuine-product IC tag 321, and thus the UID 81 that is the basis of the digital certificate 84 does not coincide with the UID stored in the IC tag 32 in a non-rewritable manner. Therefore, the hash value of the UID 81 derived from the digital certificate 84 decrypted in ACT14 described above does not coincide with the hash value of the UID 81 derived from the counterfeit-product IC tag 322 acquired in ACT21 described above.

In response to the determination that both the hash values do not coincide with each other (False) (NO in ACT16), as in the first embodiment, in ACT18 and ACT19, the controller 60 determines that the mounted ribbon roll is not a genuine product, prohibits printing, and displays, on the display device 204, the fact that a non-genuine product is mounted. The controller 60 then terminates the operation of the genuine-product determination processing.

Note that, also in the second embodiment, it is not essential to hash the UID 81. In other words, in the ink ribbon manufacturer MC, the digital certificate 84 may be created using raw data of the UID 81, and the controller 60 of the label printer 100 may also verify the digital certificate 84 by comparing the raw data of the UID 81 read from the IC tag 32 with the UID 81 decrypted from the digital certificate 84.

As described above, in the label printer 100 according to the second embodiment, the ink ribbon is mounted, the ink ribbon being provided with the IC tag 32 storing the digital certificate 84 that is generated using the encryption algorithm on the basis of the private key and the UID 81 of the IC tag 32. The controller 60 of the label printer 100 then controls the reader/writer 63 to communicate with the IC tag 32 and to read the UID 81 of the IC tag 32 and also read the digital certificate 84 stored in the IC tag 32. The controller 60 then verifies the digital certificate 84 on the basis of the public key stored in the public key memory 621 and the UID 81 read from the IC tag 32 to determine whether or not the mounted ink ribbon is a genuine product. Therefore, also in the label printer 100 according to the second embodiment, as in the first embodiment, it is possible to determine whether or not the mounted ink ribbon is a genuine product. Furthermore, in the second embodiment, the ribbon data 82 is not used for the digital certificate 84, and thus the ribbon data 82 can be rewritten.

Note that the UID 81 used to generate the digital certificate 84 is hashed, and thus in the label printer 100 according to the second embodiment, the controller 60 hashes the UID 81 read from the IC tag 32 and verifies the digital certificate 84 on the basis of the hashed UID 81 and the public key. Therefore, even if the confidentiality of data is enhanced by hashing, it is possible to determine whether or not the mounted ink ribbon is a genuine product.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing apparatus using an ink ribbon roll obtained by winding an ink ribbon around a paper core, comprising:
- a delivery shaft on which the ink ribbon roll is rotatably mounted, the delivery shaft being disposed to be inserted into the paper core of the ink ribbon roll, an outer circumferential surface of the paper core of the ink ribbon roll being provided with a wireless tag at substantially a center in an axial direction of the paper core, the wireless tag storing a digital certificate that is generated using an encryption algorithm on a basis of a private key and a unique identifier (ID) of the wireless tag;
- a reading device comprising an antenna and a reader/writer, wherein the reader/writer communicates with the wireless tag via the antenna, and reads the unique ID of the wireless tag and also reads the digital certificate stored in the wireless tag, wherein the antenna is provided to the delivery shaft; and
- a controller that verifies the digital certificate on a basis of a public key and the unique ID read from the wireless tag to determine whether or not the ink ribbon roll is a genuine product.

2. The printing apparatus according to claim 1, wherein
- the unique ID used to generate the digital certificate is hashed, and
- the controller hashes the unique ID read from the wireless tag.

3. The printing apparatus according to claim 2, wherein the controller verifies the digital certificate on a basis of the hashed unique ID and the public key.

4. The printing apparatus according to claim 1, wherein the digital certificate is generated on a basis of the private key, the unique ID, and ribbon data that is data related to the ink ribbon roll.

5. The printing apparatus according to claim 4, wherein the wireless tag stores the digital certificate and the ribbon data.

6. The printing apparatus according to claim 5, wherein the reading device further reads the ribbon data from the wireless tag.

7. The printing apparatus according to claim 6, wherein the controller verifies the digital certificate on a basis of the public key, the unique ID, and the ribbon data.

8. The printing apparatus according to claim 7, wherein the unique ID and the ribbon data that are used to generate the digital certificate are hashed, and the controller hashes the unique ID and the ribbon data that are read from the wireless tag.

9. The printing apparatus according to claim 8, wherein the controller verifies the digital certificate on a basis of the unique ID and the ribbon data that are hashed, and the public key.

10. The printing apparatus according to claim 1, wherein the controller further deletes the digital certificate stored in the wireless tag in response to detection of an end of the ink ribbon roll.

* * * * *